(No Model.)
P. W. WILLIAMS.
CULTIVATOR.
No. 282,824. Patented Aug. 7, 1883.
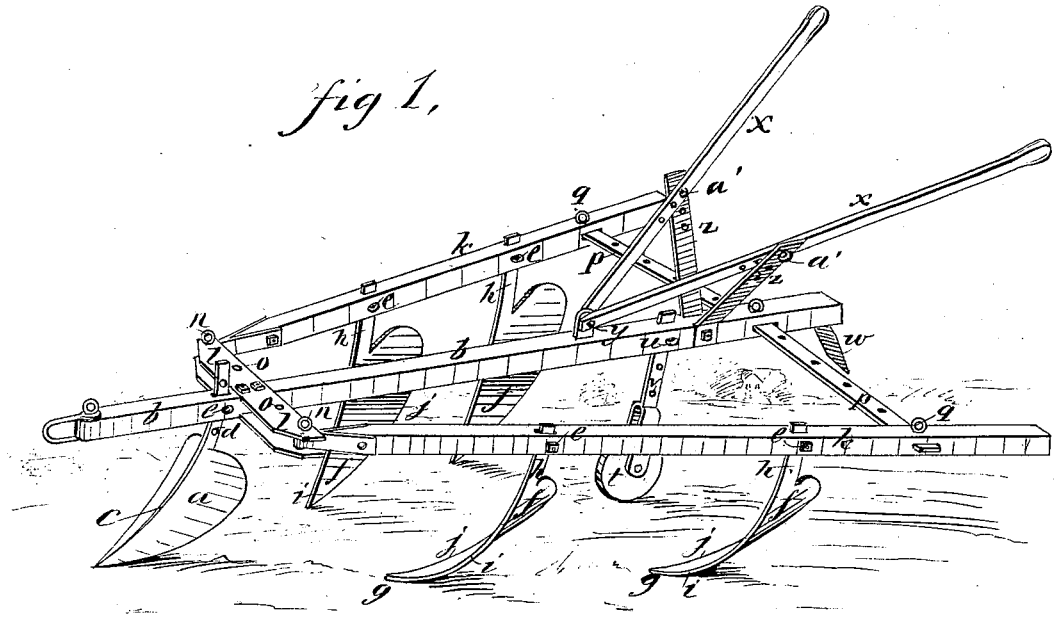
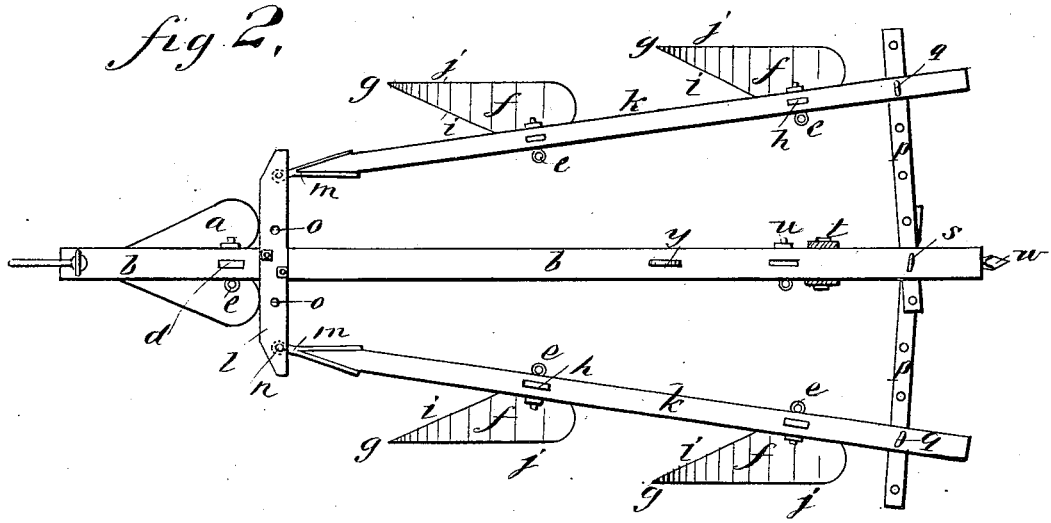
WITNESSES:
INVENTOR:
P. W. Williams
BY Munn & Co
ATTORNEYS.

UNITED STATES PATENT OFFICE.

PAUL W. WILLIAMS, OF DARDANELLE, ARKANSAS, ASSIGNOR TO HIMSELF, T. M. GIBSON, AND ZENAS L. WISE, OF SAME PLACE.

CULTIVATOR.

SPECIFICATION forming part of Letters Patent No. 282,824, dated August 7, 1883.

Application filed April 10, 1883. (No model.)

*To all whom it may concern:*

Be it known that I, PAUL W. WILLIAMS, of Dardanelle, in the county of Yell and State of Arkansas, have invented a new and Improved Cultivator, of which the following is a full, clear, and exact description.

The object of this invention is to produce an improved cultivator to be used for throwing up and preparing beds for the planting of cotton and all other crops to be planted and raised in drills or rows, and for cultivating the same and all others, except such as are sown broadcast.

Reference is to be had to the accompanying drawings, forming part of this specification, in which similar letters of reference indicate corresponding parts in both the figures.

Figure 1 is a perspective view of my improved cultivator, and Fig. 2 is a plan view.

For the front plow, $a$, to be placed in the middle beam, $b$, when required, I employ a plow having two blades or mold-boards inclined alike each way from the middle line of the cutting-edge $c$, and suitably curved from the point back and up to the shank $d$ for shaving up the soil by a sharp, clean, cutting action adapted to make it work easy and prevent clogging, the said plow to be fitted detachably in the beam by its shank, and a pin, $e$, to be removed when not required for use, as when throwing up the cotton-beds.

For the side plows I make one blade or mold-board, $f$, only to turn one way, and for these I propose to make still longer curves from the point $g$ up to the shank $h$, for insuring sharp shaving action in the soil; but the special feature of my improvement in these plows consists of the pitch or inclination of the shank $h$ with relation to the front or cutting edge, $i$, and the back edge, $j$, whereby, when the plows are set in the beams, the said cutting-edges incline laterally to the line of the draft at a sharp angle, so as to shear-cut into the soil by an easy action, the points inclining outward when the plows are set for turning outward, as in Fig. 2, and inclining inward when set for turning inward, as in Fig. 1, the said pitch or twist of the shank being such that when set as in Fig. 2 the discharging side or edge of the mold-board will be about parallel with the line of movement of the cultivator; but when the plows are set for turning inward, as in Fig. 1, the points of the plows will incline more to the center than in Fig. 2, and in that case edges $i$ will make a greater angle to the line of draft than as in Fig. 1, so as to make the furrow-slices a little wider for ridging up the cotton or other bed. Like the front plow, the side plows are detachably fastened by a pin or bolt, $e$, that is detachable, to allow the plows to be shifted from side to side, according as it is wanted to turn the furrows in or out.

The side plows are attached to the side beams, $k$, and these are connected at the front ends to the cross-bar $l$ by eye-straps $m$ and pins $n$, for which different holes, $o$, are provided along the cross-bar, to allow the plows to be set wider apart or closer together, as may be required for different kinds of work, and to adjust the rear ends of the beams $k$, they are connected to the middle beam, $b$, by the bars $p$ and pins $q$ $s$, said bars being fitted through beam $b$, so as to shift along it and be fastened by the pin $s$, it being preferable to shift said bars in said beam rather than shift the outer beams, $k$, on the bars, to avoid so much extension of bars $p$ outside of beams $k$ as would sometimes interfere with the growing plants.

To regulate the depth that the plows $f$ will run in the ground, I employ a roller-gage, $t$, to the middle beam, near the rear end, said gage being adjustable up or down in the beam by a pin, $u$, and holes $v$ in the beam $b$, and the stock of the regulators, respectively.

For opening the drill in the cotton-bed in which to plant the seed, the front plow, $a$, not being used, I propose to attach the drill-opener $w$ to the rear end of the middle beam.

For shifting the handles $x$ up or down to alter their height to suit different persons, I pivot them to a stud of the middle beam at $y$, and secure them detachably to the standards $z$ by pins $a'$, which may be readily shifted from one position to another.

It will be seen that this improved cultivator may be used for throwing up the cotton-bed, barring off and cultivating plants sown in drills in all the required forms of such cultivation.

Having thus described my invention, I claim as new and desire to secure by Letters Patent—

1. The combination, with the beams $k$, of plows having a single blade, $f$, and a shank, $h$, inclined with respect to the edges $i$ $j$, to bring the cutting-edge on a lateral incline to the line of draft, and thereby act upon the soil with a shear-cut, as described.

2. The wedge-shaped drill-opener $u$, in combination with the rear end of the beam of a plow adapted to open ridges, as and for the purpose specified.

PAUL W. WILLIAMS.

Witnesses:
J. F. ANTHONY,
VELASCO C. CAFFRY.